United States Patent
Aridah et al.

(10) Patent No.: US 12,126,124 B2
(45) Date of Patent: *Oct. 22, 2024

(54) POWER CONNECTOR USING RESISTIVE SENSING

(71) Applicant: VOLTSAFE INC., Vancouver (CA)

(72) Inventors: Sanad Aridah, Port Coquitlam (CA); Arash Janfada, Maple Ridge (CA); Trevor Burgess, Vancouver (CA)

(73) Assignee: VOLTSAFE INC., Vancouver (CA)

( * ) Notice: Subject to any disclaimer, the term of this patent is extended or adjusted under 35 U.S.C. 154(b) by 324 days.

This patent is subject to a terminal disclaimer.

(21) Appl. No.: 17/539,567

(22) Filed: Dec. 1, 2021

(65) Prior Publication Data

US 2022/0115824 A1    Apr. 14, 2022

Related U.S. Application Data

(63) Continuation of application No. 16/476,093, filed as application No. PCT/CA2018/000006 on Jan. 5, 2018, now Pat. No. 11,228,148.

(Continued)

(51) Int. Cl.
*H01R 13/713* (2006.01)
*H01R 13/24* (2006.01)
(Continued)

(52) U.S. Cl.
CPC ....... *H01R 13/713* (2013.01); *H01R 13/2421* (2013.01); *H01R 13/6205* (2013.01);
(Continued)

(58) Field of Classification Search
CPC .............. H01R 13/713; H01R 13/2421; H01R 13/6205; H01R 13/6616; H01R 13/6683;
(Continued)

(56) References Cited

U.S. PATENT DOCUMENTS 3,808,577 A    4/1974 Mathauser
4,230,390 A *  10/1980 Wells ................... H01R 13/623
                                                            285/361

(Continued)

FOREIGN PATENT DOCUMENTS

CA    2775681 A1    10/2013

OTHER PUBLICATIONS

CNIPA, Office Action for CN Application No. 201880005966.0 dated Apr. 9, 2021.

(Continued)

*Primary Examiner* — Travis S Chambers
(74) *Attorney, Agent, or Firm* — Norton Rose Fulbright Canada LLP

(57) ABSTRACT

There is provided a power connector system for electrically connecting a power source to a device. The power connector comprises a first component and a second component which each have a plurality of electrical contacts disposed on a face thereof. The contacts each include an electrically resistive element having an impedance. When the first and second components are coupled, a logic unit controls enables current flow between the first and second components based on the impedances.

28 Claims, 17 Drawing Sheets

Related U.S. Application Data

(60) Provisional application No. 62/442,519, filed on Jan. 5, 2017.

(51) Int. Cl.
  *H01R 13/62* (2006.01)
  *H01R 13/66* (2006.01)
  *H01R 24/38* (2011.01)
  *H01R 43/26* (2006.01)
  *H01R 103/00* (2006.01)
  *H02M 7/02* (2006.01)

(52) U.S. Cl.
  CPC ..... *H01R 13/6616* (2013.01); *H01R 13/6683* (2013.01); *H01R 13/6691* (2013.01); *H01R 24/38* (2013.01); *H01R 43/26* (2013.01); *H01R 2103/00* (2013.01); *H02M 7/02* (2013.01)

(58) Field of Classification Search
  CPC .... H01R 13/6691; H01R 24/38; H01R 43/26; H01R 2103/00; H01R 13/7037; H01R 2107/00; H01R 13/5219; H01R 13/6658; H02M 7/02; G08C 17/00
  See application file for complete search history.

(56) References Cited

U.S. PATENT DOCUMENTS

| | | | |
|---|---|---|---|
| 7,351,066 | B2 | 4/2008 | DiFonzo et al. |
| 9,083,110 | B2 | 7/2015 | McClelland |
| 9,172,233 | B2* | 10/2015 | Vasquez ................ H01R 24/30 |
| 9,225,126 | B2* | 12/2015 | Janfada ................ H01R 13/629 |
| 9,281,638 | B2 | 3/2016 | McBroom et al. |
| 9,660,378 | B2 | 5/2017 | Silvers et al. |
| 10,468,818 | B2 | 11/2019 | Giampi |
| 11,228,148 | B2* | 1/2022 | Aridah ................ H01R 13/713 |
| 2007/0072442 | A1 | 3/2007 | DiFonzo et al. |
| 2008/0227321 | A1* | 9/2008 | Reusche ............ H01R 13/5219 439/271 |
| 2008/0280461 | A1* | 11/2008 | DiFonzo ............ H01R 13/6205 439/39 |
| 2009/0182688 | A1 | 7/2009 | van der Zwan et al. |
| 2011/0169342 | A1* | 7/2011 | Tinaphong ............ H01R 13/70 307/126 |
| 2012/0261988 | A1* | 10/2012 | Byrne ................ H01R 13/6616 307/112 |
| 2014/0177737 | A1* | 6/2014 | Vasquez ................ H02H 5/04 375/257 |
| 2014/0220806 | A1 | 8/2014 | Liang |
| 2014/0235075 | A1 | 8/2014 | Kim et al. |
| 2015/0093919 | A1 | 4/2015 | McBroom et al. |
| 2015/0318638 | A1 | 11/2015 | McClelland |
| 2016/0190734 | A1 | 6/2016 | Rohrbach et al. |
| 2016/0254616 | A1* | 9/2016 | Kim ...................... G05B 11/01 307/116 |
| 2017/0193793 | A1* | 7/2017 | Ricciuti ................ G01R 15/18 |
| 2018/0340970 | A1* | 11/2018 | Emerich ............ H01R 13/5221 |

OTHER PUBLICATIONS

EPO, Extended European Search Report for EP Application No. 18735896.5 dated May 26, 2020.

CNIPA, Office Action and Search Report for CN Application No. 201880005966.0 dated Jul. 13, 2020.

WIPO, International Search Report and Written Opinion for PCT Application No. PCT/CA2018/000006 dated Apr. 4, 2018.

KIPO Notice of Allowance for Korean Patent Application No. 10-2019-7023023 Oct. 29, 2022.

Office Action for Canadian Patent Application No. 3,049,271 dated Sep. 14, 2023.

Office Action for European Patent Application No. 18 735 896.5 dated Jul. 10, 2023.

EPO, Office Action for EP Application No. 18735896.5 dated Dec. 11, 2021.

JPO, Office Action for JP Application No. 2019-536519 dated Dec. 7, 2021.

USPTO, Office Action for U.S. Appl. No. 16/476,093 dated Jul. 6, 2021.

USPTO, Office Action for U.S. Appl. No. 16/476,093 dated Oct. 13, 2020.

USPTO, Office Action for U.S. Appl. No. 16/476,093 dated Jun. 8, 2020.

Ipau, Office Action for AU Application No. 2018206676 dated Nov. 5, 2021.

CNIPA, Office Action for CN Application No. 201880005966.0 dated Aug. 26, 2021.

AU IP Examination report No. 1 for AU Application No. 2018206676 dated Nov. 5, 2021.

* cited by examiner

POWER CONNECTOR USING RESISTIVE SENSING

CROSS-REFERENCE TO RELATED APPLICATIONS

This application is a continuation stemming from U.S. patent application Ser. No. 16/476,093, which claims the benefit of U.S. Provisional Patent Application No. 62/442,519, filed on Jan. 5, 2017, the contents of all of which are hereby incorporated by reference in their entireties.

FIELD

The present application relates to a power connector for power transmission, and in particular, to a power connector which uses resistive sensing.

BACKGROUND

Conventional power connectors generally include a male plug with conducting prongs extending outward from the plug, and a female plug with sockets for accepting the conducting prongs on the male plug. The male and female components are typically held together by the frictional force between the prongs and the walls of the cavities. When connected, a power connector allows power to flow from a power source on one side of the connector, to a device on the other side of the connector.

The insertion and removal of a conventional male plug into and from a conventional female plug can be cumbersome. At times, the pulling force required to remove the male end may be excessive. For example, in cold weather, components may contract slightly, which may increase the frictional force between the male prongs and the female sockets. It is possible that exerting an excessive pulling force to separate the male and female ends could damage the plugs and/or the associated electronics.

For example, block heaters are used throughout the world to help automobile engines turn over in cold temperatures. Current block heaters are plugged into power main lines with the use of standard 14-16 American Wire Gauge wires, which terminate with NEMA 5-15 connectors. In cold conditions, the metallic pins and plastic housing of the plugs may contract, which makes it increasingly difficult to connect and disconnect the power to the block heater. Users may be required to exert themselves physically (by having to apply a force on the order of tens of pounds of pulling force) to disconnect the cords. This may result in fraying of the cord and plug connection points, exposed live wires and improper contacts (which may lead to a shock and/or electrocution), strain injuries to the user, and failure of the block heater. There is also the possibility that the user forgets to unplug the block heater, and pulls away from the outlet. This could cause damage to the block heater and/or the vehicle, as well as the connection wires. It would be desirable to have power connector components that can be joined and separated with a moderate amount of force required from the user.

Moreover, conventional plugs do not provide control over the flow of current. Once plugged in, conventional power connectors allow current to flow from the power source to the device. This can pose a safety risk in certain situations, particularly when a power connector is used for transmitting high voltage AC signals. It would be desirable to have power connectors which do not suffer from the difficulties and challenges described above.

SUMMARY

In accordance with one aspect, there is provided a power connector for electrically connecting a power source to a device, the power connector comprising: a first component comprising: a first set of electrical contacts including a first electrically resistive element having a first impedance; a logic unit; and a first face having the first set of electrical contacts disposed thereon; and a second component comprising: a second set of electrical contacts including a second electrically resistive element having a second impedance; and a second face having the second set of electrical contacts disposed thereon; wherein coupling the first component to the second component causes the first set of electrical contacts to form an electrical connection with the second set of electrical contacts; and wherein the logic unit is configured to enable current flow between the first component and the second component based at least in part on the first impedance and the second impedance.

In accordance with another aspect, there is provided a method of enabling a current flow between a power source and a device, the method comprising: providing a first component having a first set of contacts on a first face, wherein the first set of contacts includes a first electrically resistive element having a first impedance; providing a second component having a second set of contacts on a second face, wherein the second set of contacts includes a second electrically resistive element having a second impedance; forming an electrical connection between the first set of contacts and the second set of contacts; enabling current flow between the first component and the second component based at least in part on the first impedance and the second impedance.

BRIEF DESCRIPTION OF DRAWINGS

In the figures, which illustrate example embodiments.

DETAILED DESCRIPTION

Figure 1A:
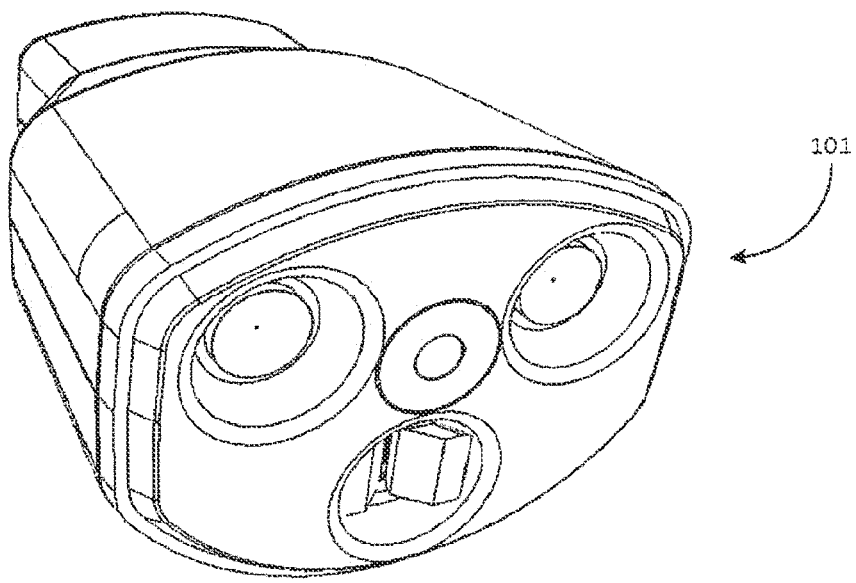
FIGS. 1A and 1B are perspective views of active and passive components, respectively, of a power connector, according to some embodiments.
Figure 1B:
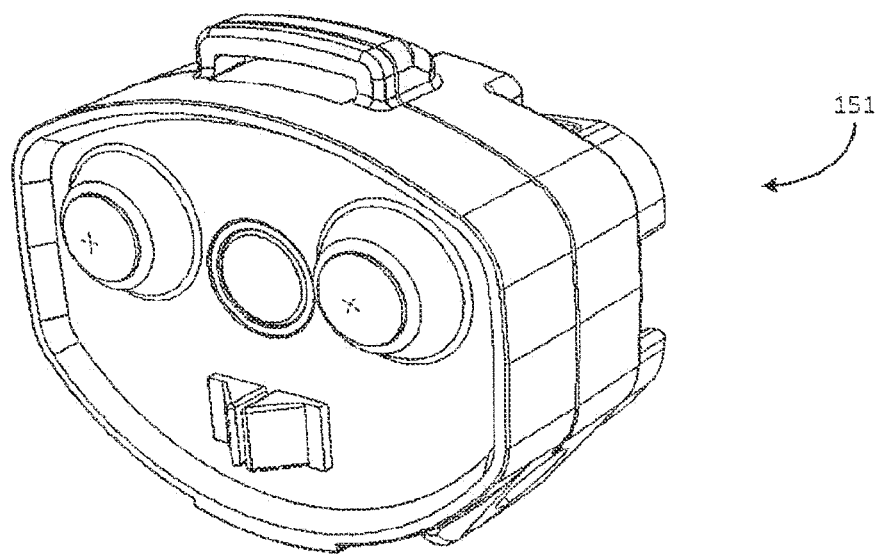

The systems and methods described herein may be implemented in a variety of ways. FIGS. 1A and 1B are perspective views of an active component 101 and a passive component 151, respectively, of a power connector 100, according to some embodiments. In some embodiments, the active component 101 and the passive component 151 may be brought into contact to form an electrical connection. It should be noted that the active and passive components can be realized using many different shapes, and that the embodiments described herein are intended as non-limiting examples.

In some embodiments, the power connector 100 includes active component 101 and passive component 151. Active component 101 and passive component 151 each have a plurality of electrical contacts disposed thereon. When the faces of the active and passive components are coupled, the electrical contacts on the active and passive components form an electrical connection. In some embodiments, AC current is permitted to flow between one or more of the electrical contacts on the active and passive components. In some embodiments, control circuitry or logic may govern whether AC current is allowed to flow between the active and passive components. Various embodiments and features associated therewith are discussed in further detail below.

Figure 2A:
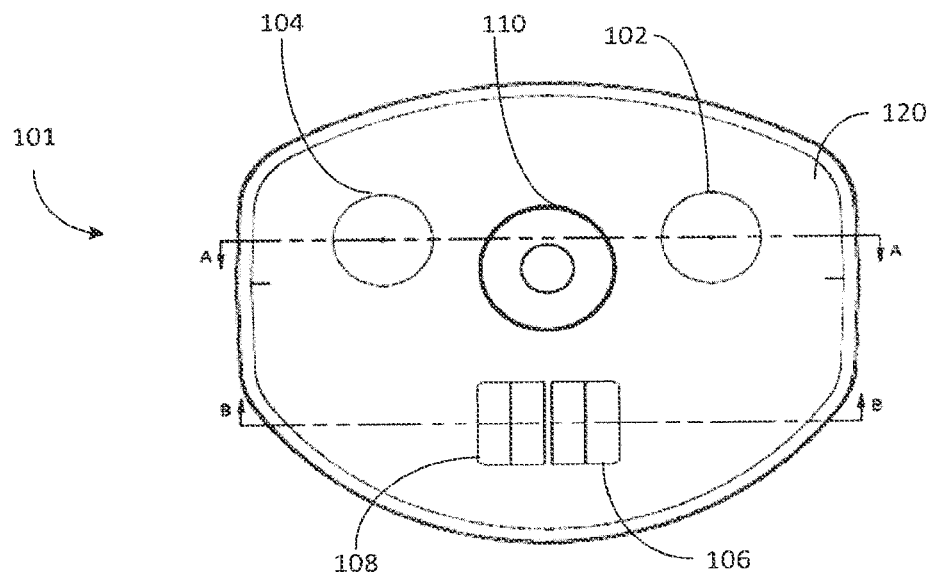
FIG. 2A is a front view of an active component, according to some embodiments.

FIG. 2A is a front view of active component 101, according to some embodiments. Active component 101 comprises face 120, which may be substantially planar and/or contoured. Face 120 may comprise a plurality of electrical contacts 102, 104, 106 and 108 disposed thereon. In some embodiments, the face 120 further comprises a ferromagnetic element 110 disposed thereon. In some embodiments, the ferromagnetic element 110 may be a plate made of steel or of any magnetic material.

The electrical contact 102 may be a hot contact. The electrical contact 104 may be a neutral contact. The electrical contact 106 may be a ground contact. The electrical contact 108 may be a resistive contact having an impedance associated therewith.

Although the example embodiment in FIG. 2A illustrates four electrical contacts, it should be appreciated that other embodiments are contemplated which may have more than four electrical contacts, or less than four electrical contacts. For example, certain countries do not require a ground contact and as such, some embodiments may not feature a ground contact.

Figure 2B:
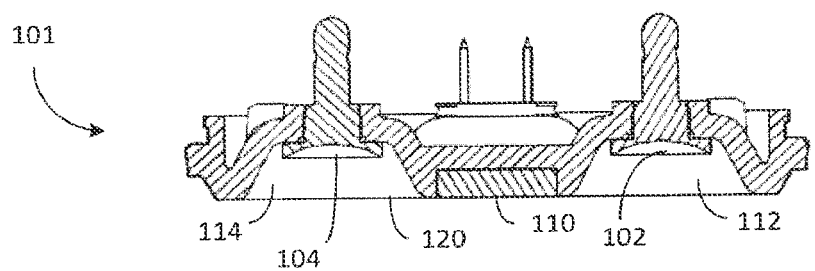
FIG. 2B is a cross-sectional view (A-A) of the active component, according to some embodiments.

FIG. 2B is a cross-sectional view (A-A) of the active component 101 shown in FIG. 2A. In this example embodiment, the face 120 of active component 101 includes two recessed portions 112 and 114, in which electrical contacts 102 and 104, respectively, are located. In some embodiments, electrical contacts 102 and 104 have a concave shape.

Figure 2C:
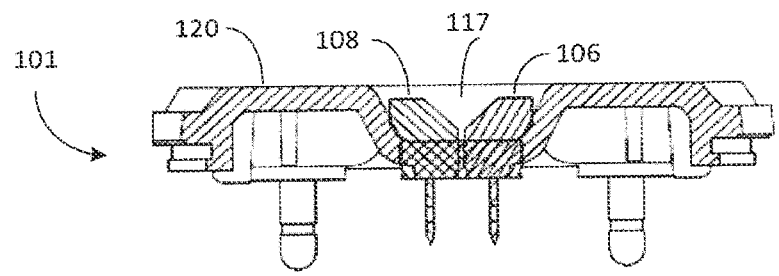
FIG. 2C is a cross-sectional view (B-B) of the active component, according to some embodiments.

FIG. 2C is a cross-sectional view (B-B) of the active component 101 shown in FIG. 2A. It can be seen that face 120 of active component 101 further includes a recess 117 in which electrical contacts 106 and 108 are located. In this example embodiment, electrical contacts 106 and 108 are shaped with a substantially trapezoidal cross-sectional shape, such that the combination of electrical contacts 106 and 108 forms a wedge-like shape. In some embodiments, the depth of recess 117 from face 120 is shallower than the depth of the recesses 112 and 114 housing electrical contacts 102 and 104.

Figure 3A:
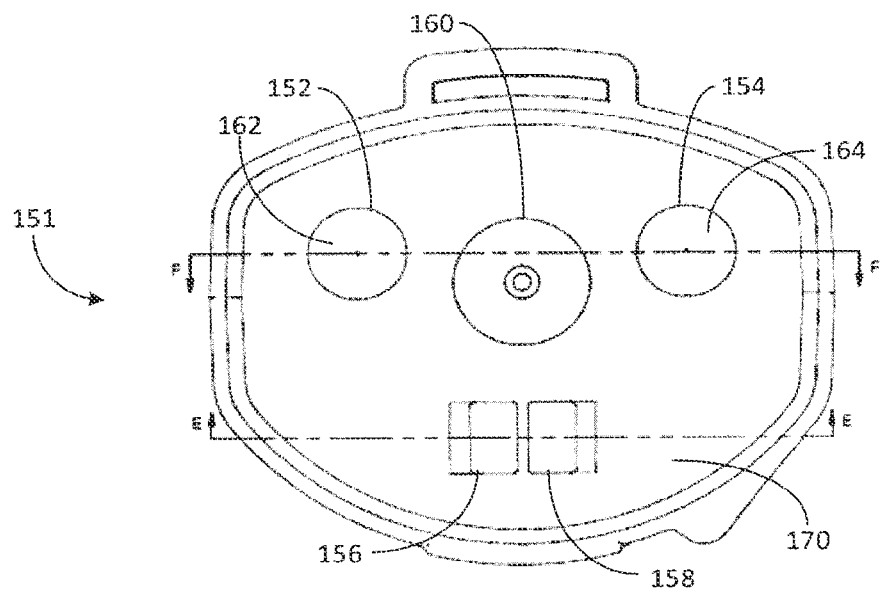
FIG. 3A is a front view of a passive component, according to some embodiments.

FIG. 3A is a front view of a passive component 151, according to some embodiments. The passive component comprises a face 170, which may be substantially planar and/or contoured. Face 170 may comprise a plurality of electrical contacts 152, 154, 156 and 158 disposed thereon. In some embodiments, face 170 further comprises a magnetic element 160 disposed thereon.

The electrical contact 152 may be a hot contact. The electrical contact 154 may be a neutral contact. The electrical contact 156 may be a ground contact. The electrical contact 158 may be a resistive contact having an impedance associated therewith. As noted above in relation to active component 101, although four electrical contacts are illustrated in this example, it should be appreciated that other embodiments may have more than four electrical contacts, and other embodiments may have less than four electrical contacts.

Figure 3B:
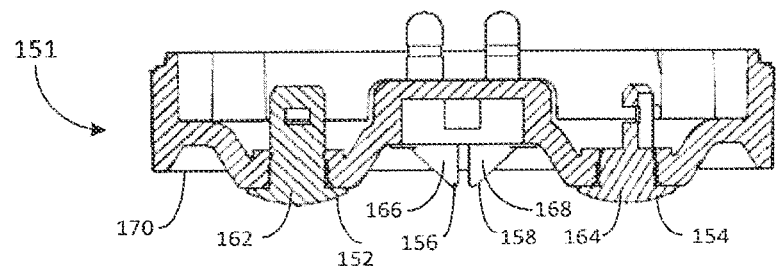
FIG. 3B is a cross-sectional view (F-F) of the passive component, according to some embodiments.

FIG. 3B is a cross-sectional view (F-F) of the passive component 151 shown in FIG. 3A. In this example embodiment, face 170 includes a set of protrusions 162, 164 on which electrical contacts 152 and 154 are located. In some embodiments, electrical contacts 152 and 154 have a convex shape. In some embodiments, the shape of electrical contacts 152 and 154 is complementary to the shape of electrical contacts 102 and 104 on active component 101.

Figure 3C:
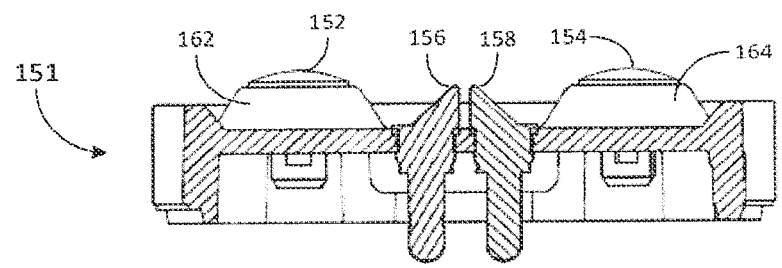
FIG. 3C is a cross-sectional view (E-E) of the passive component, according to some embodiments.

FIG. 3C is a cross-sectional view (E-E) of the passive component 151 shown in FIG. 3A. It can be seen that face 170 includes a second set of protrusions 166, 168 on which electrical contacts 156 and 158 are located. In this example embodiment, electrical contacts 156 and 158 are shaped with a substantially triangular cross-sectional shape, such that the combination of electrical contacts 156 and 158 forms a substantially pyramidal structure. In some embodiments, the wedge-like shape formed by electrical contacts 106 and 108 and the pyramidal structure formed by electrical contacts 156 and 158 are complementary.

Figure 4A:
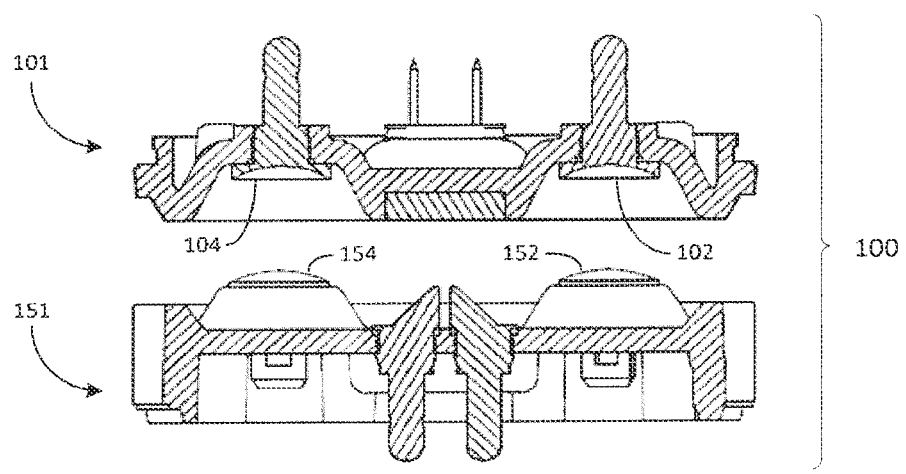
FIG. 4A is an illustration of a first set of protrusions on the passive component being brought into contact with a first set of recesses on the active component, according to some embodiments.
Figure 4B:
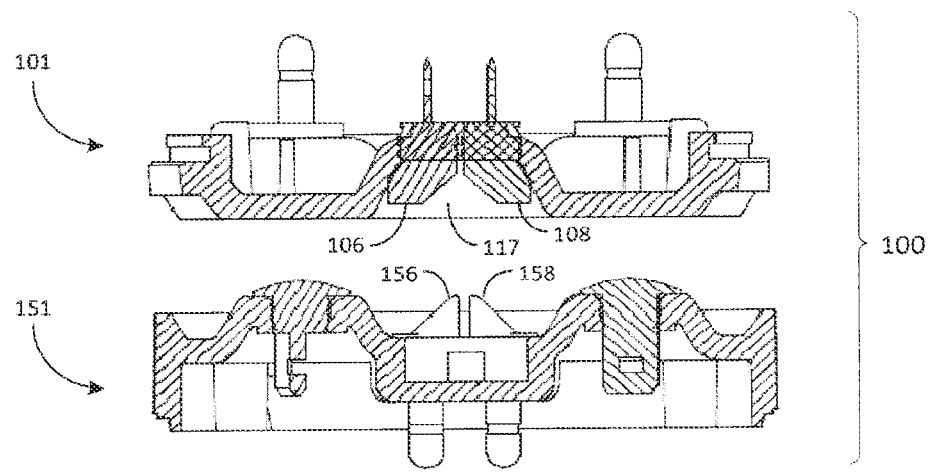
FIG. 4B is an illustration of a second set of protrusions on the passive component being brought into contact with a second set of recesses on the active component, according to some embodiments.

FIG. 4A is an illustration of the first set of protrusions 162, 164 on the passive component 151 being brought into proximity with a first set of recesses 112, 114 on the active component 101, according to some embodiments. FIG. 4B is an illustration of the passive and active components being coupled with emphasis on the second set of protrusions 166, 168 and recess 117.

When the active component 101 and the passive component 151 are coupled, the faces 120 and 170 are brought into proximity. In some embodiments, faces 120 and 170 may not physically touch, and the physical contact may be limited to the electrical contacts. As illustrated, the first set of convex protrusions 162, 164 on the passive face 170 are accommodated by the first set of concave recesses 112, 114 on the active face 120. This allows electrical contact 102 to form a connection with electrical contact 152, and for electrical contact 104 to form a connection with electrical contact 154. In some embodiments, the recesses 112, 114 on the active component 101 are dimensioned larger than the protrusions 162, 164 on passive component 151, which may allow the protrusions 162, 164 to slide laterally within the recesses 112, 114 on active component 101.

In some embodiments, the concave and convex electrical contacts on the active and passive components may provide additional surface area for transmission of high current electricity relative to conventional blade connectors, pole (rounded) connectors, or the like as are commonly used presently. This may reduce the likelihood of arcing, which is associated with high current passing through a small surface area of the electrical contacts, which in turn causes the temperature of the localized area to rise, presenting a potential fire hazard. An increased surface area for transmission may reduce the likelihood of such fire hazards.

During coupling of the active component 101 and the passive component 151, the second set of protrusions 166, 168 and electrical contacts 156 and 158 (which form a pyramidal shape) are brought into contact with the wedge-shaped structure formed by the trapezoidal-shaped electrical contacts 106 and 108 and recess 117. In some embodiments, the pyramidal shape and the wedge shape are dimensioned such that the wedge shape acts as a receptor for the pyramidal shape.

In some embodiments, the depth of the wedge-shaped structure on active component 101 relative to face 120 is shallower than the depth of the recesses 112, 114 housing electrical contacts 102 and 104. The shallower depth of the wedge structure may allow electrical contacts 156 and 158 to make contact with electrical contacts 106 and 108 before electrical contacts 152 and 154 make contact with electrical contacts 102 and 104, respectively.

Such a configuration may be desirable if regional regulations or design considerations require that a certain contact be the first to make contact when coupling, be the last to be separated when de-coupling, or both. For example, in some regions, the regulating body may require that the ground contacts be the first to make contact when coupling, and the last to separate when de-coupling. In some embodiments, this requirement may be satisfied by selecting the ground contacts to be either 106 and 156, or 108 and 158 (i.e. as one of the contacts on the wedge and pyramidal structures).

In some embodiments, during coupling of the active component 101 and the passive component 151, the magnetic element 160 is brought into sufficient proximity with the ferromagnetic element 110 to exert a magnetic attractive force between the ferromagnetic element 110 and the magnetic element 160. In some embodiments, the active and passive components may comprise a plurality of ferromagnetic elements 110 and magnetic elements 160. As the active component 101 and passive component 151 are brought closer together, the magnitude of the magnetic attractive force increases.

In some embodiments, the magnitude of the magnetic attractive force is sufficient to keep the active and passive components coupled, but not so strong that an excessive physical force would be required in order to separate the active and passive components. For example, the separation force required should not be so strong that there is any risk of damaging power supply cables or the underlying electrical devices. Moreover, the magnetic attractive force may be tuned such that the active and passive components would separate in the event of accidental pulling (e.g. a person tripping over the cord). In some embodiments, the magnetic attractive force is approximately 3 to 5 pounds of force. However, an attractive force greater or less than this range can be selected based on the particular circumstances and components being used.

In some embodiments, the use of the magnetic attractive force (a non-frictional force) to keep the active and passive components connected (rather than the use of a frictional force) may lengthen the lifetime of one or more of the electrical contacts 102, 104, 106, 108, 152, 154, 156, 158.

Many different configurations are contemplated for the active and passive components. Although a particular configuration is described above, there are other configurations in which the electrical contacts on the active component 101 can come into contact with the electrical contacts on the passive component 151.

Figure 9A:
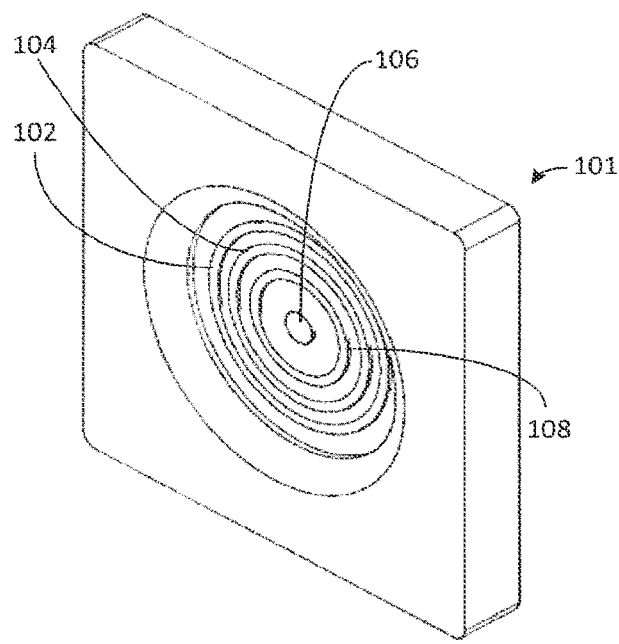
FIG. 9A is a perspective view of an alternative embodiment of an active component.
Figure 9B:
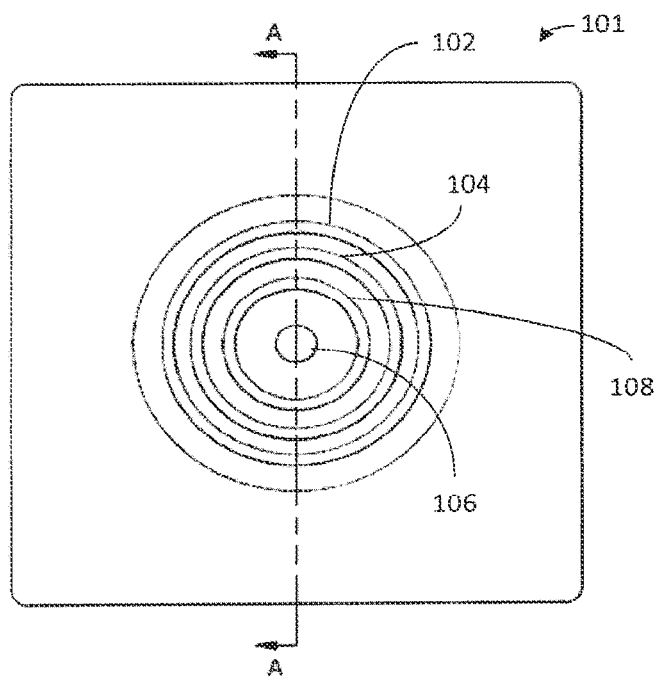
FIG. 9B is a front view of the active component shown in FIG. 9A.
Figure 9C:
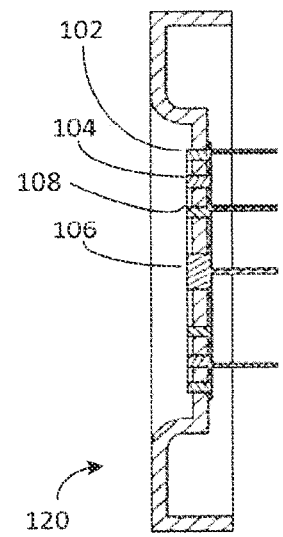
FIG. 9C is a side view of the active component shown in FIG. 9A.

FIG. 9A is a perspective view of an alternative embodiment of the active component 101. As shown, the contacts may take the form of concentric conducting circular or elliptical strips 102, 104, 106 and 108 on the active component. FIG. 9B is a front view of the embodiment of the active component 101 shown in FIG. 9A. The conducting rings may be separated by insulating rings, so as to electrically isolate each of the neutral, hot, ground and resistive contacts. It should be appreciated that although the conducting strips are referred to herein as rings, there is no particular shape required. As such, the example embodiments described herein should not be taken to have a limiting effect on the configurations possible for the conducting strips on the active or passive components. The insulating layers may be made of, for example, plastic. It should be appreciated that the electrical contacts can be associated with any conducting ring, and that the configuration shown in FIGS. 9A-9C is merely an example. For example contact 102 can be associated with one of the inner conducting rings, rather than the outermost conducting ring, as shown.

FIG. 9C is a side view of the embodiment of the active component 101 shown in FIGS. 9A and 9B. As can be seen from the side profile of active component 101, the conducting rings 102, 104, 106 and 108 may be relatively flat on the face 120 of the active component 101. In other embodiments, the conducting rings may have varying depths within face 120.

Figure 9D:
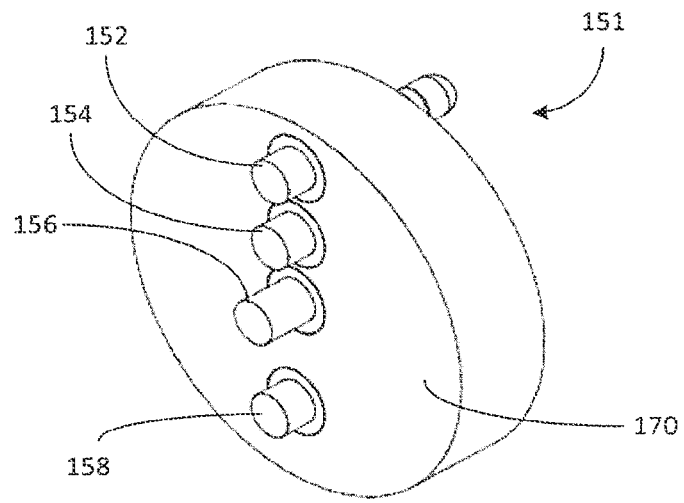
FIG. 9D is a perspective view of an example passive component.

FIG. 9D is a perspective view of an example embodiment of passive component 151. As shown, passive component 151 has a plurality of protrusions extending from face 170.

One or more of electrical contacts 152, 154, 156 and 158 may be associated with the protrusions extending from face 170. The spacing between the protrusions on face 170 of passive component 151 may correspond to the spacing between the conducting rings on the example embodiment of active component 101, such that the electrical contacts 152, 154, 156 and 158 form electrical connections with electrical contacts 102, 104, 106 and 108, respectively, on active component 101.

Figure 9E:
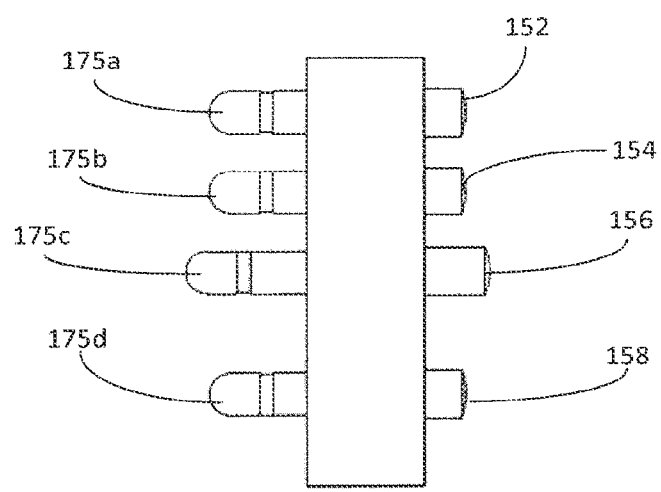
FIG. 9E is a side view of the example passive component shown in FIG. 9D.

FIG. 9E is a side view of the passive component 151 shown in FIG. 9D. As shown, electrical contacts 152, 154, 156 and 158 protrude from face 170 of passive component 151. In the example embodiment shown, the protrusion corresponding to ground contact 156 protrudes further from face 170 than the protrusions corresponding to the other electrical contacts 152, 154 and 158, which may correspond to, for example, the hot, neutral and resistive contact connections. This may allow for the ground contact 156 to make contact with ground contact 106 on active component 101 prior to any other electrical connections being formed, which may be desirable in some regions. Also shown in FIG. 9E are electrical connectors 175a-175d, which provide connections to the underlying electrical circuitry in the device (not shown) which is ultimately being powered by the power source connected to active component 101.

Figure 9G:
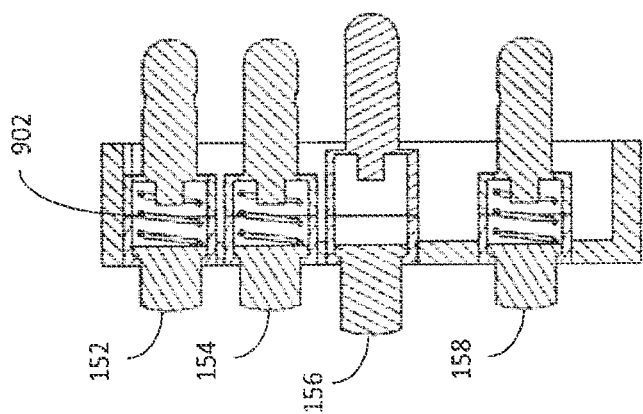
FIG. 9G is a cross-sectional view (A-A) of the example passive component shown in FIG. 9F.
Figure 9F:
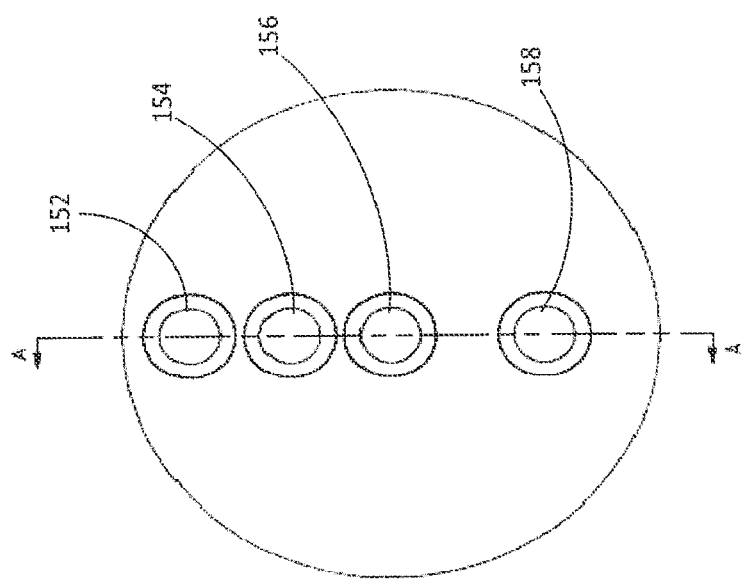
FIG. 9F is a front view of the example passive component shown in FIG. 9D.

FIG. 9F is a front view of the example embodiment of the passive component 151 shown in FIG. 9D. In this particular configuration, each of contacts 152, 154, 156 and 158 lie along a diameter of the face, which is circular in this example. However, it should be appreciated that the shape of the passive component 151 is not necessarily circular in all embodiments, and that the electrical contacts need not be located along a diameter. For example, any configuration in which one or more of the contacts 152, 154, 156 and 158 are spaced from the center of the face so as to align with the conducting rings on active component 101 would provide the necessary functionality.

FIG. 9G is a cross-sectional view of the example passive component 151 through axis A-A shown in FIG. 9F. In some embodiments, one or more of the protrusions may be biased outwardly from face 170 by resilient members 902. In some embodiments, the resilient member may be a spring. Biasing the contacts outwardly may provide an advantage, in that any imprecisions in the machining of the length of either the protrusions or the receiving cavity on the active component 101 may be accounted for by allowing protrusions to protrude by varying lengths from the face of passive component 151. This may ensure that proper contact between each electrical contact may be reliably achieved.

Figure 9H:
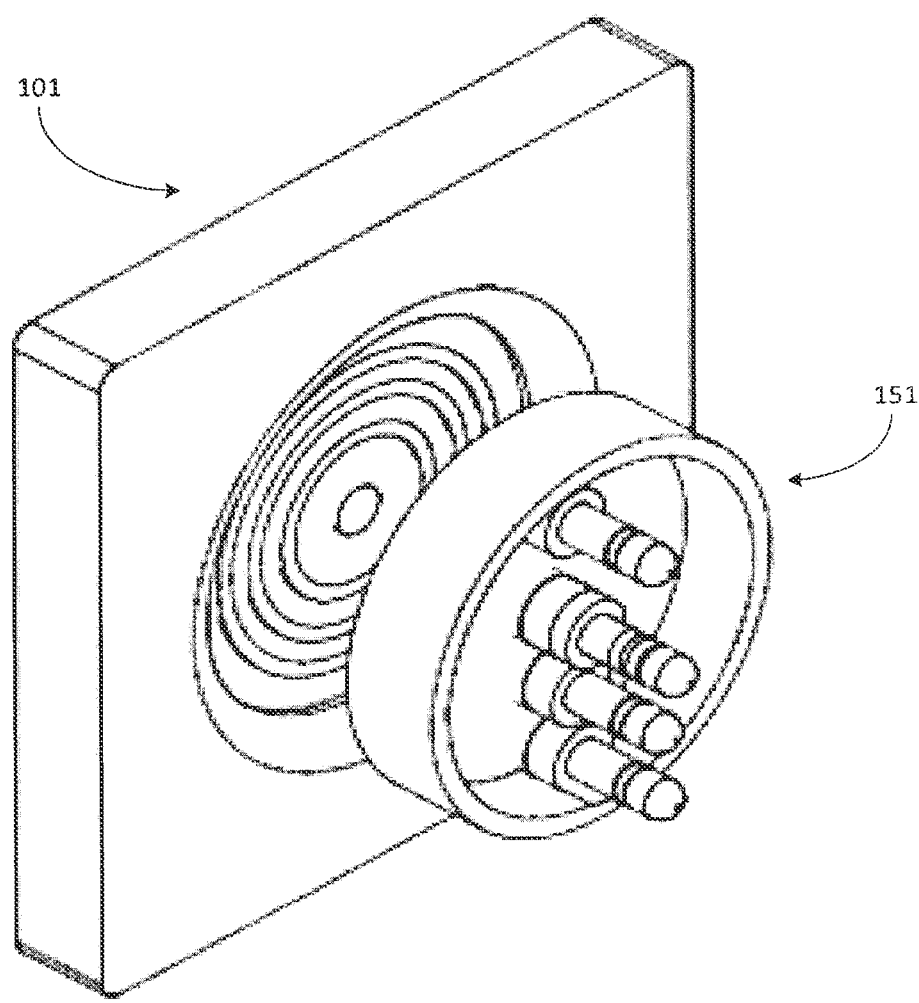
FIG. 9H is a perspective view of the example active component and passive components being brought into proximity.

FIG. 9H is a perspective view of the example passive component 151 shown in FIG. 9D being brought into proximity with the example active component 101 shown in FIG. 9A. As shown, concentric conducting rings on the active component 101 to form an electrical connection with the protrusions on the passive component 151. One benefit of such a configuration is that protrusions on the passive component 151 combined with the ring structure of the contacts on the active component 101 may allow for a high variability in terms of the angular approach required to establish a connection. For example, no particular orientation of the active and passive components is required in order to establish a physical connection between the electrical contacts. This may be particularly helpful for visually impaired users, and for power receptacles in hard-to-reach locations. In some embodiments, the conducting rings are separated by insulating rings. In some embodiments, the insulating rings may be made of plastic.

It should also be recalled that when joining the passive component 151 to the active component 101 in FIG. 9H, the protrusion on the passive component 151 corresponding to the ground contact 156 may protrude from face 170 further than the other electrical contacts 152, 154 and 158. Thus, in this example embodiment, the conducting ring 106 corresponding to the ground contact may be the first contact which makes physical contact with the passive component 151 when the active and passive components are being joined, and may also allow the ground contacts 156 and 106 to be the last contacts to disconnect when the active and passive components are being separated.

It should further be noted that in the previous example, the passive component 151 contained protrusions, and the active component 101 contained conducting rings and/or recesses. However, in some embodiments, the active component 101 may instead have protrusions, and the passive component 151 may comprise the conducting rings. This specification contemplates the contact configurations on the active and passive components to be interchangeable, in some embodiments, provided the necessary complementary relationships are maintained so as to allow electrical connections to form between one or more of electrical contacts 102, 104, 106, 108 and 152, 154, 156 and 158. Thus, the example embodiments described herein should not be seen as limiting the active component 101 to only containing recesses for accepting protrusions from the passive component 151. The active component 101 may comprise protrusions, or a combination of protrusions and recesses. The passive component 151 may also comprise recesses, or a combination of protrusions and recesses, for establishing electrical connections between the contacts.

Figure 10A:
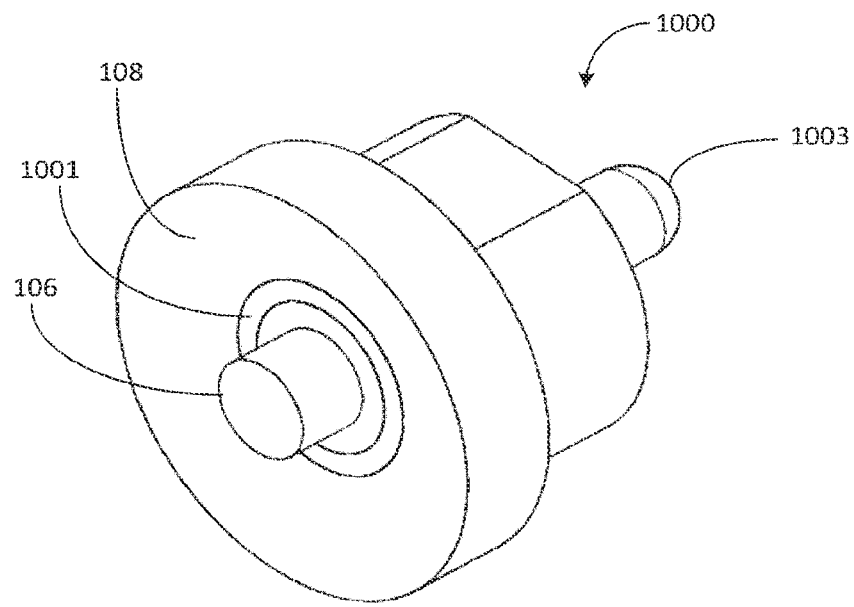
FIG. 10A is a perspective view of an example component in an embodiment of an active component.
Figure 10B:
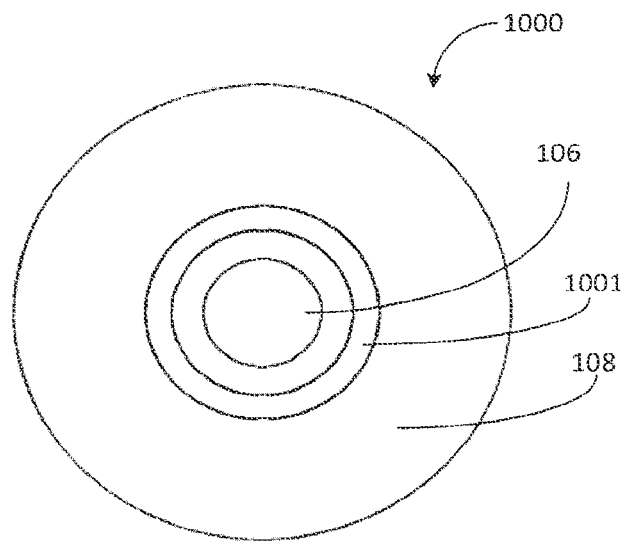
FIG. 10B is a front view of the example component of FIG. 10A.
Figure 10C:
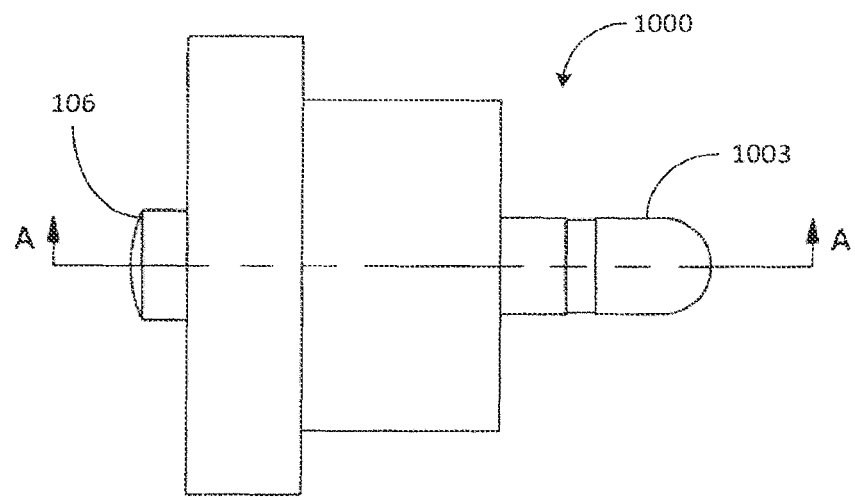
FIG. 10C is a side view of the example component of FIG. 10A.
Figure 10D:
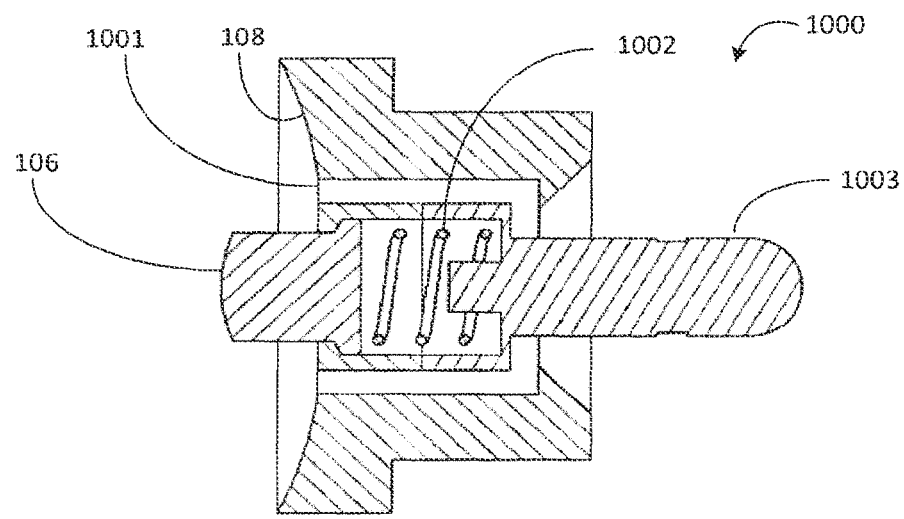
FIG. 10D is a cross-sectional view (A-A) of the example component of FIG. 10A.

Turning now to another example embodiment, in some embodiments, one or more contacts may be grouped together on active component 101 or passive component 151. Moreover, one or more contacts may be biased outwardly by one or more resilient members 1002. FIG. 10A is a perspective view of an example module 1000 of active component 101. In module 1000, electrical contacts 106 and 108 are grouped together. As shown, the electrical contact 106 in the middle (in this example, the ground contact) protrudes outwardly. In some embodiments, electrical contact 106 is biased outwardly by a spring 1002 (as shown in FIG. 10D). In some embodiments, the ground contact 106 may be a spring-mounted plunger contact.

Electrical contact 106 may be separated from electrical contact 108 by an insulating ring 1001, which may be made of rubber or any other suitable insulating material. As shown in FIG. 10D, the insulating ring 1001 may extend throughout the body of module 1000 so as to electrically isolate the electrical contact 106 from electrical contact 108. FIG. 10B is a front view of the module 1000 shown in FIG. 10A. As shown in each of FIGS. 10A, 10C and 10D, the module 1000 may further comprise a grounding pin 1003 for connecting to the power source.

Figure 10E:
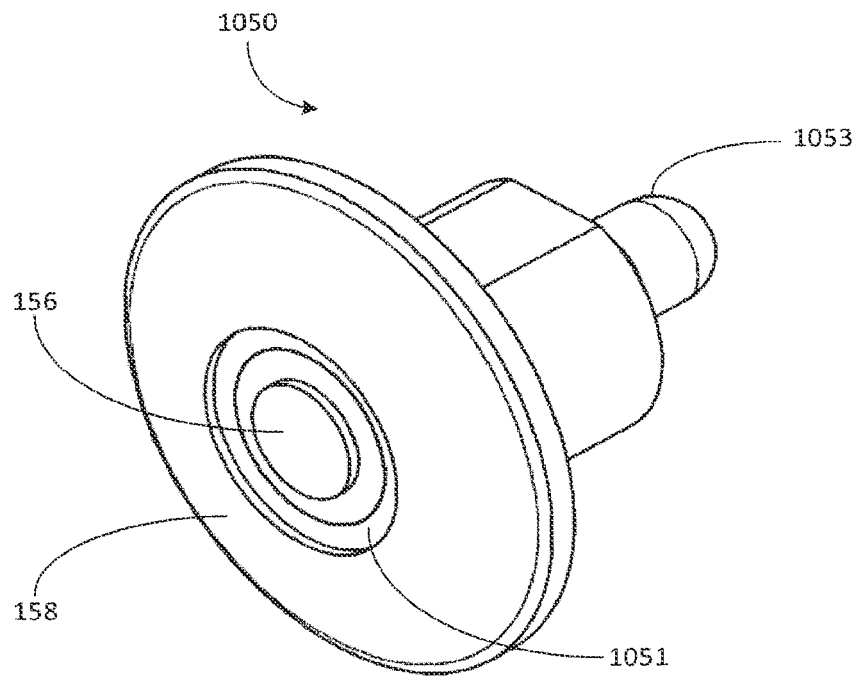
FIG. 10E is a perspective view of an example component in an embodiment of a passive component.
Figure 10F:
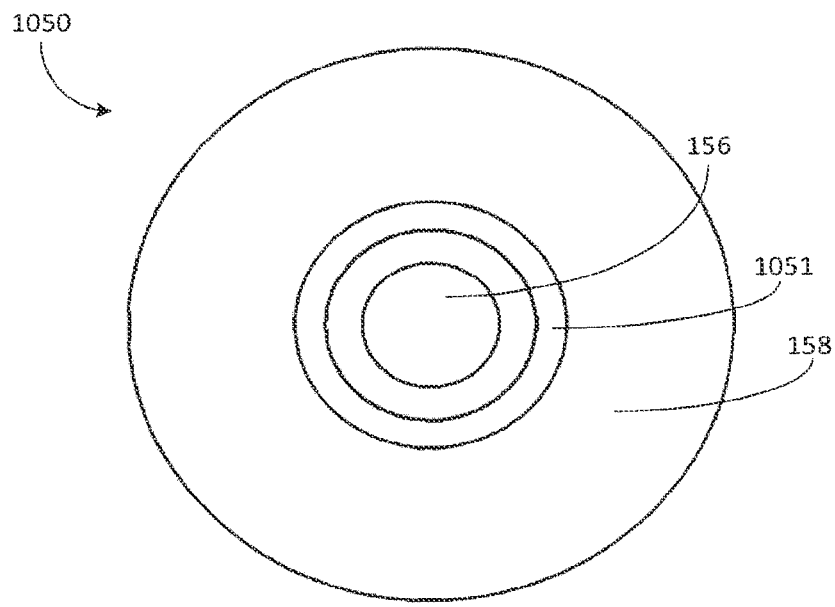
FIGS. 10F, 10G and 10H are front, side, and cross-sectional views, respectively of the example component of FIG. 10E.
Figure 10G:
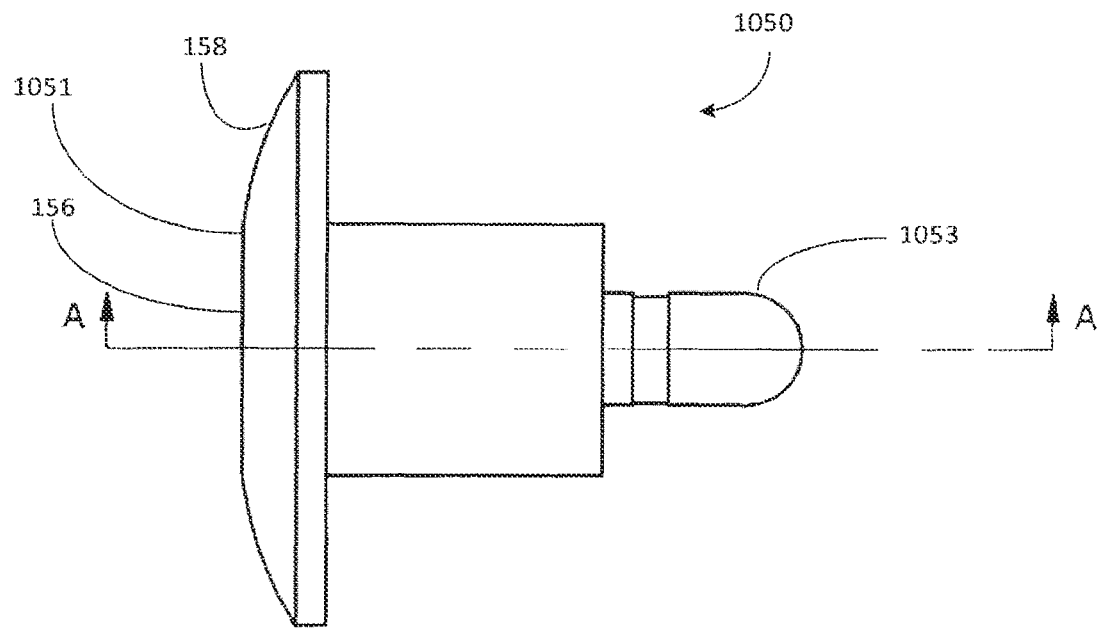
Figure 10H:
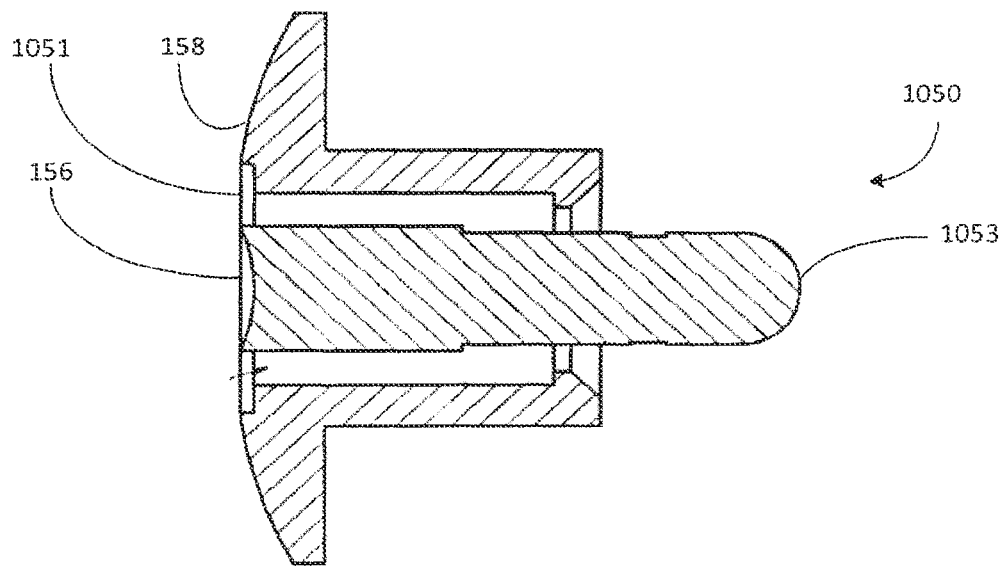

FIG. 10E is a perspective view of an example module 1050 which is complementary in shape to module 1000. As shown, the module 1050 has electrical contact 156 (in this example, the ground contact) disposed in the center, with an insulating ring 1051 separating electrical contact 156 and electrical contact 158. The module 1050 further comprises grounding pin 1053, which connects to the device (not shown). As shown in FIG. 10H, the insulating ring 1051 may extend throughout the body of module 1050, so as to electrically isolate the contact 156 (e.g. the ground contact)

from contact 158 (e.g. the resistive contact). FIGS. 10F and 10G provide further front and side views of the module 1050.

In some embodiments, active component 101 comprises module 1000, and passive component 151 comprises module 1050. In this example, when passive component 151 is pressed into the active component 101, contact 106 on module 1000 makes physical contact with contact 156 on module 1050 prior to any of the other contacts. Once contact is made between the modules 1000 and 1050, the contact 106 can be pressed into the body of module 1000, because the spring 1002 can be compressed to accommodate the contact 106. Although the spring 1002 would exert a force operating to separate the modules 1000 and 1050, it will be recalled that the passive and active components may comprise one or more magnetic elements 160 and ferromagnetic elements 110 which provide an attractive force sufficient to overcome the force exerted by the spring 1002 on the plunger contact 106.

It should be appreciated that in some embodiments, module 1000 is integrated into active component 101, and module 1050 may be integrated into passive component 151. In other embodiments, the modules 1000 and 1050 are separate parts which are adapted to be accommodated by active component 101 and passive component 151, respectively. It should be further noted that although the example modules 1000 and 1050 described herein housed the ground and resistive contacts, other implementations are contemplated in which any two of the hot, neutral, ground and resistive contacts are implemented within modules 1000 and 1050.

In some embodiments, circuitry is provided in the active device 101 to control the establishment of an electrical path to the passive device 151. That is, although the electrical contacts 102, 104, 106, 108 are in physical contact with electrical contacts 152, 154, 156 and 158, respectively, the existence of a physical connection between the contacts may not be sufficient to enable power to flow without the satisfaction of further conditions, as described below, according to some embodiments.

Figure 5:
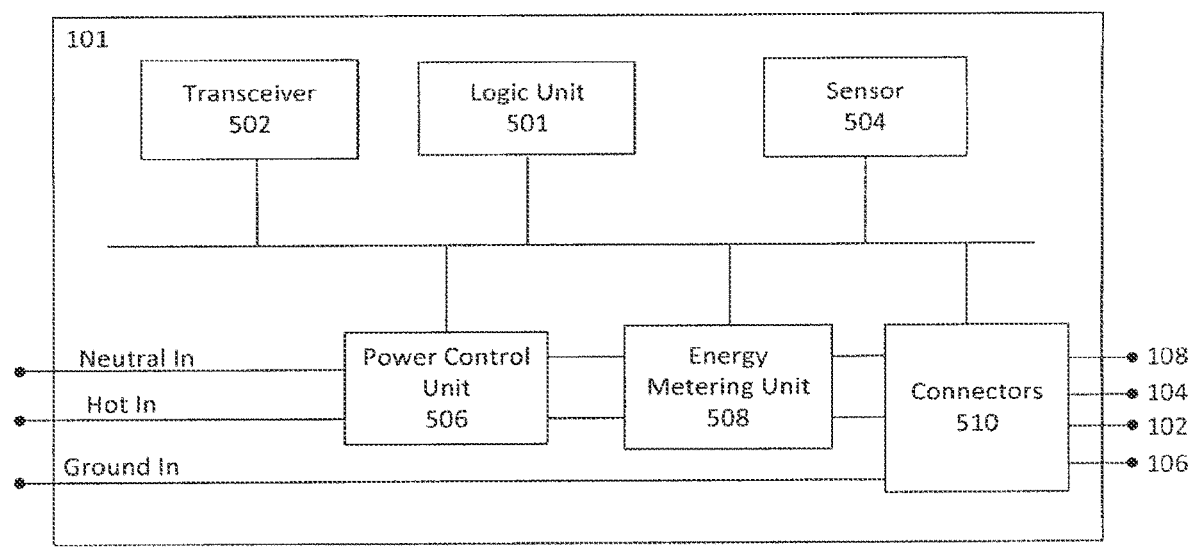
FIG. 5 is a block diagram of an example active component, according to some embodiments.

FIG. 5 is a block diagram of components found in an example active component 101, according to some embodiments. As depicted, the active component 101 includes a logic unit 501, a transceiver 502, a sensor 504, a power control unit 506, an energy metering unit 508, and connectors 510. The active component 101 is configured to accept the hot, neutral and ground connections from a power source and provide these connections to a device connected to the passive component 151 when certain conditions are satisfied. In some embodiments, the power connector 100 is configured not to allow power flow by default, in the absence of one or more conditions being satisfied. This may ensure that the electrical contacts on the active component are always off and safe to the touch until the passive component 151 is present and fully physically connected to the active component 101. This may reduce the chance of electric shocks and electrocution. Moreover, some embodiments of power connector 100 may prevent users from accidentally or intentionally tampering with an active component 101 to activate the device.

The logic unit 501 is configured to control the power flow from the active component 101 to the passive component 151. As shown in FIG. 5, the hot in, neutral in, and ground in connections from a power source are taken as inputs for the active component 101. In some embodiments, logic unit 501 is configured to control a set of electrical relays (which act as switches) which allow the passage of the hot, neutral and ground currents when in the closed state, and prevent the flow when in the open state. Thus, when enabled by logic unit 501, the hot, neutral and ground currents can pass from the connectors 510 on the active component 101 to the passive component 151.

Although FIG. 5 depicts the logic unit 501 as being internal to the active component 101, it is contemplated that in some embodiments, logic unit 501 is external or separated from the active component 101. In embodiments where the logic unit 501 is external or separate from the active component 101, measurements from the hot, neutral and ground inputs may be transmitted to the logic unit 501 via transceiver 502. The logic unit 501 may then process the measurements and provide one or more instructions to the relays via transceiver 502 as to whether to allow current flow or not.

Figure 6:
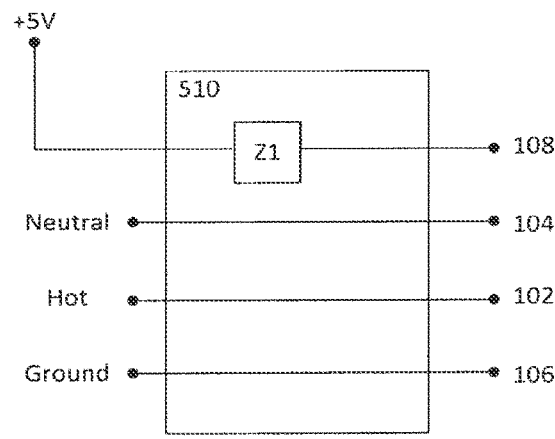
FIG. 6 is an expanded block diagram of the plug connectors of an active component, according to some embodiments.

FIG. 6 is a simplified block diagram of the connectors 510 of an active component, according to some embodiments. As shown, the example connectors include electrical contacts 102, 104, 106 and 108. In this example, electrical contact 108 is a resistive contact and does not carry any of the AC voltages from the power source. Rather than carrying the voltages from the power source, the electrical contact 108 is supplied with a reference voltage (in this example embodiment, the reference voltage may be +5 V DC or any suitable DC reference voltage), and has a resistive element, with an impedance of Z1. As noted above, the impedance can be real (e.g. purely resistive), imaginary (e.g. purely reactive), or a combination thereof. In some embodiments, the DC reference voltage is obtained by taking a portion of the input signal from the AC power source and converting it to a DC signal. In some embodiments, the reference voltage may be an AC voltage.

Figure 7:
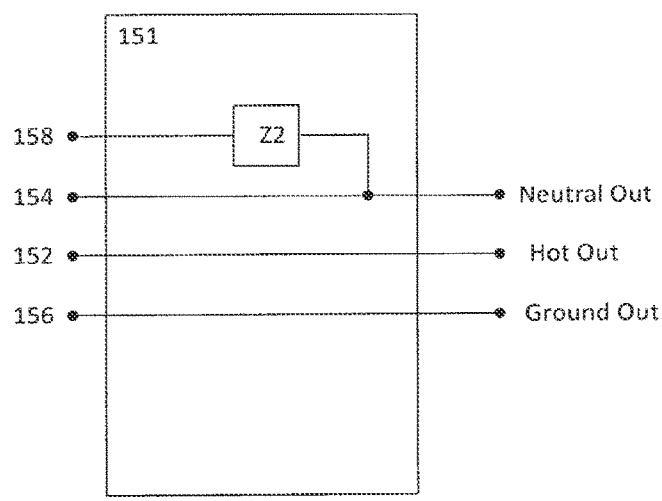
FIG. 7 is an expanded block diagram of the plug connectors of a passive component, according to some embodiments.

FIG. 7 is a simplified block diagram of passive component 151. As shown, the electrical contacts 152, 154, 156 and 158 are present on passive component 151. In this example, the left side of passive component 151 illustrates the side of the passive component which interacts with active component 101. The right side of passive component 151 in this example illustrates the output which is delivered to a recipient electrical device (not shown). As with electrical contact 108 on the active side, electrical contact 158 on the active side is a resistive contact and is not used for passing the AC currents from the power source to the recipient electrical device. Electrical contact 158 is instead associated with an impedance, Z2, and connects to the neutral connection. Impedance Z2 can be purely resistive, purely reactive, or a combination of real and imaginary impedances.

Figure 8:
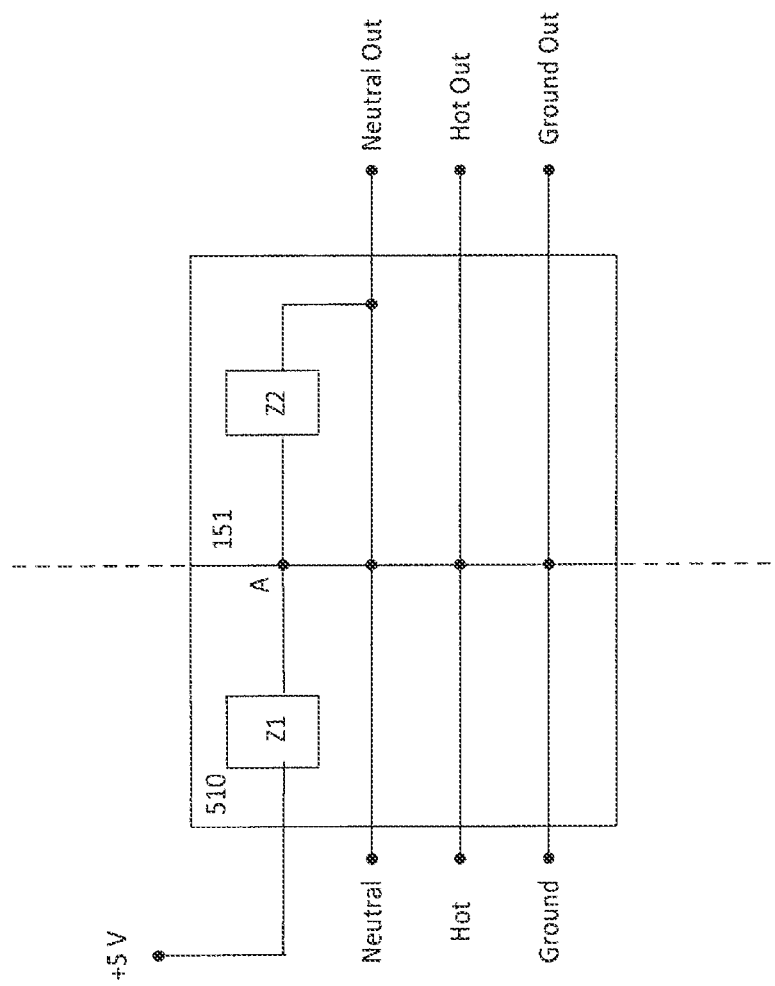
FIG. 8 is a block diagram of an example active plug component connected to an example passive plug component, in accordance with some embodiments.

FIG. 8 is a simplified block diagram of the active and passive components in a physically connected state, according to some embodiments. It should be noted that the existence of a physical connection between connectors 510 and passive component 151 may not sufficient on its own for power to flow. As illustrated, there are physical connections between each of the contacts 102, 104, 106, 108 and 152, 154, 156, 158 (which correspond to hot, neutral, and ground connections in this example embodiment). It will also be noted that the connection of contact 108 with contact 158 creates a connection between the two impedances denoted as Z1 and Z2.

As a simplified example, if Z1 and Z2 are purely resistive contacts with resistances of R1 and R2, then according to circuit theory, this example configuration creates a voltage divider. That is, the voltage measured at point A in FIG. 8 would be equal to the product of the input voltage (5 V DC in this example) with the ratio of R2/(R1+R2). A mathematically convenient case exists in the case where R1 and R2 are equal. In this case, the voltage measured at point A would simply be one half of the input voltage.

Returning to the example in FIG. 5, in some embodiments, the logic unit 501 may periodically poll the state of various contacts. In some embodiments, the logic unit 501 is configured to poll the voltage at point A in FIG. 8. This may be accomplished by, for example, mapping a pin of a microcontroller to point A. Based on the observed voltage, or other observed characteristics, the logic unit 501 may send a signal to close the relays and allow power to flow between the active component 101 and the passive component 151. In some embodiments, the logic unit 501 may delay the flow of current after the requisite conditions for enabling current flow have been satisfied by a predetermined amount of time. Delaying the flow of current may, for example, enhance the safety of the connector 100 by ensuring that the electrical contacts 102, 104, 106, 108 are not live while being held by a user, and become live after a predetermined period of time in which it is not possible for the user to be touching the contacts.

There are many possible conditions which may be suitable for triggering the logic unit 501 to close the relays and allow power to flow. In some embodiments, the first impedance Z1 must be substantially equal to the second impedance Z2 in order for the logic unit 501 to enable power flow. In such a case, the determination could be made simply by observing that the voltage at point A is approximately one half of the input voltage (e.g. an observed voltage of 2.5 V at point A when the input voltage is 5 V). In some embodiments, a predetermined relation or condition between the first and second impedances must be satisfied to enable power flow. The logic unit 501 may comprise one or more of a comparator, a processor, a microcontroller, or any other hardware and/or software design suitable for making the determinations discussed herein.

A number of advantages may be derived from the use of a resistive sensing scheme with a power connector 100, according to some embodiments. For example, different active components 101 and passive components 151 can be manufactured with specific impedance values which satisfy a certain criteria (e.g. equal impedance values). This would allow an additional layer of control over the power connector 100, since only a particular passive component 151 which has the correct impedance value could be used with a particular active component 101. For example, in a house with young children, dangerous appliances or tools could be used with a passive component 151 which is only compatible with a particular active component 101 located in a particular part of the house. This would aid in the prevention of the unwanted use of certain electric devices.

Returning to FIG. 5, active component 101 may comprise a power control unit 506. The power control unit 506 accepts the hot in and neutral in connections from the power source. In some embodiments, the power control unit 506 comprises one more electric relays, which act as electronically controlled switches. The logic unit 501 provides a signal to power control unit 506 which indicates whether the relays should be open (to prevent power flow) or closed (to allow the hot and neutral voltages to flow). When the relays are closed, the hot in and neutral in currents are allowed to flow to the plug connectors 510 and, optionally, to energy metering unit 508.

Power control unit 506 may comprise an AC/DC conversion unit 560 and a power transmission unit 562. A circuit diagram for an example embodiment is provided in FIG. 11. As illustrated, the AC/DC conversion unit 560 may comprise various resistors and capacitors with a MOSFET-driven oscillator integrated circuit (IC). As can be seen in FIG. 5, the power control unit 506 accepts the hot in and neutral in connections from the power source. In some embodiments, the IC is capable of converting an input voltage from the power source in the range of 85 V AC-265 V AC to an output of 12 V DC, with up to 360 mA of supply current. In some embodiments, the supply current may exceed 360 mA. The 12 V DC output may be used in part to power the relay units in the power transmission unit 562, as well as various other components (including, for example, one or more light emitting diodes which illuminate when power flow is enabled).

In some embodiments, the 12 V DC output is further sent to a DC to DC step-down converter, which provides an output voltage of 5 V DC. In some embodiments, the 5 V DC output may be used to power the logic unit 501 and the components in communication therewith. The 5 V DC signal may also be used as the reference signal for the voltage divider created when electrical contacts 108 and 158 are connected. The example AC/DC conversion unit 560 described herein may provide system-level thermal overload protection, and output short-circuit and open-circuit control loop protection. Moreover, the example AC/DC conversion unit 560 may be rated for a breakdown voltage of up to 700 V, which may be helpful in withstanding input power surges.

In some embodiments, the power transmission unit 562 may comprise one or more relays, which may be rated for various power levels. For example, such relays may be capable of delivering 30 Amperes of continuous current with a maximum contact voltage of 400 V AC. The relays may be controlled by logic unit 501, such that the relays may not conduct in the absence of a signal from the logic unit 501 enabling the relays to close. The relays may be electrically isolated from the lower power components by way of, for example, an opto-isolator. Opto-isolators are a type of solid state relay which may lower the amount of current necessary from the output of logic unit 501 in order to activate the deactivate the relay contacts.

Active component 101 may also comprise a sensor 504 for detecting the presence of a magnetic field. In some embodiments, sensor 504 is a Hall Effect sensor or switch which generates a current when a sufficiently strong magnetic field has been detected. In embodiments in which the passive component includes a magnetic element 160 and the active component includes a ferromagnetic element 110, the signal from sensor 504 indicating the presence of a magnetic field may be used as a precondition to enabling current flow between the active and passive components. This would provide an additional layer of control and redundancy for the power connector 100.

Figure 11:
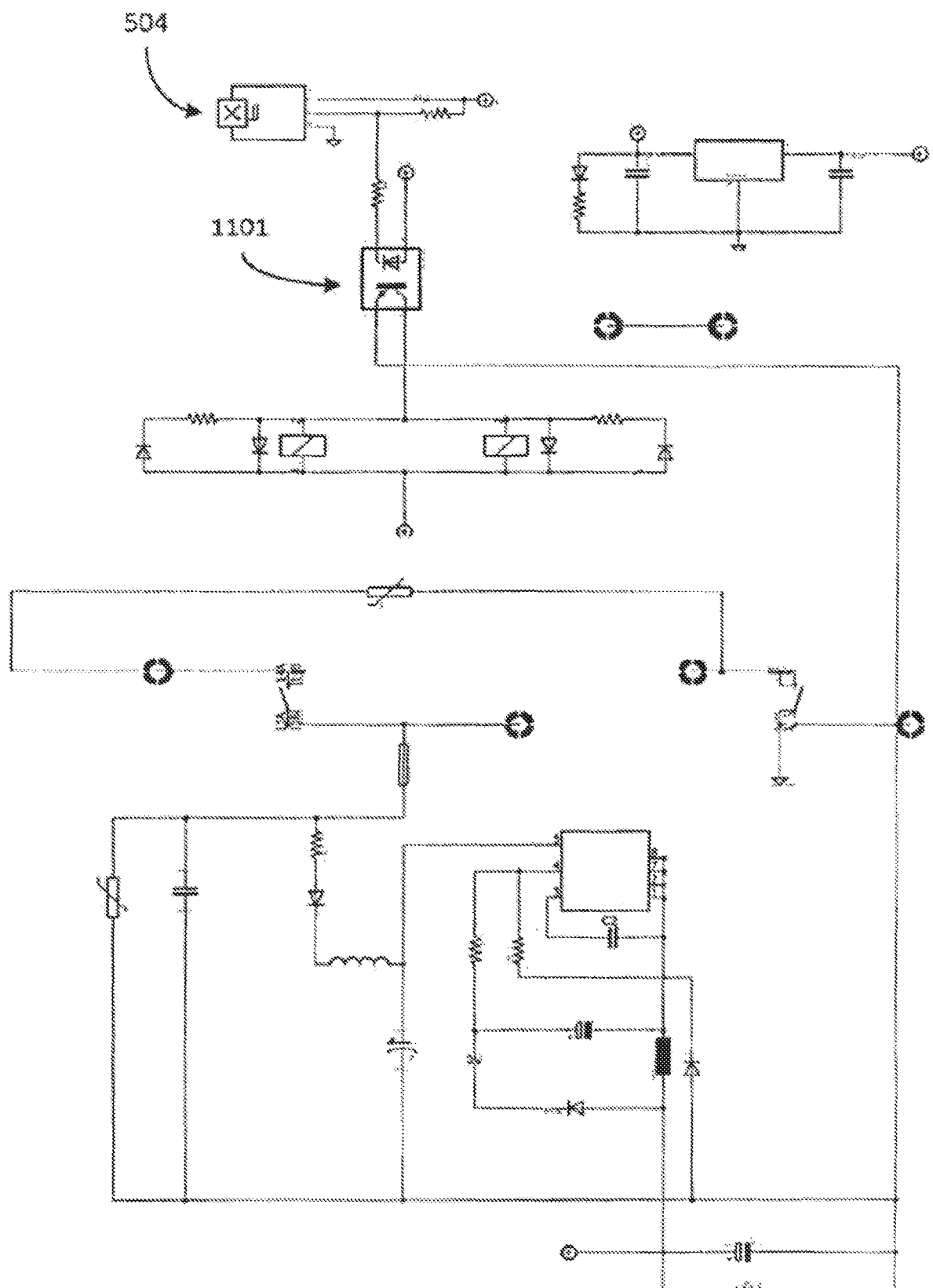
FIG. 11 is a schematic diagram of showing the circuitry in an example embodiment of the power connector.

For example, as illustrated in FIG. 11, the Hall Effect sensor 504 is coupled to the opto-isolator 1101 such that in the absence of a magnetic field, the LED in the opto-isolator 1101 will not produce sufficient light to activate the opto-isolator 1101. Thus, in the absence of a localized magnetic field, the electrical contacts on the active component 101 would be off and safe to the touch until a passive component 151 with a magnetic element 160 is sufficiently close to the active component for the generated magnetic field to be strong enough to activate the opto-isolator.

Moreover, this provides an extra layer of control over what connectors are able to be used with the active component 101. If one were to attempt to use a counterfeit passive component which had the appropriate shapes and correct electrical contact configurations, but did not include a magnetic element, the absence of the enabling signal from sensor 504 would prevent the relays in the active component 101 from closing. Thus, particularly in the case of power connectors 100 used outdoors, the use of active component 101 would prevent an unauthorized person from connecting an electrical device to a user's outlet and stealing electricity. Conventional outlets found outdoors may be used by anyone and do not normally require authorization in order to conduct electricity.

In some embodiments, the active component 101 includes energy metering unit 508. Metering unit 508 accepts the hot in and neutral in connections from a power source or from the power control unit 506. Metering unit 508 is configured to measure and monitor the energy consumption by the passive device 151 and any device connected thereto. In some embodiments, the energy consumption data may be stored in memory. In some embodiments, the energy consumption data may be transmitted to the user, optionally in real-time. In some embodiments, the energy metering unit 508 may provide the energy consumption data to the logic unit 501. This may allow the logic unit to detect any operational inconsistencies. For example, current leakage caused by a ground fault can be measured by the energy metering unit 508, and the logic unit 501 can disable power flow in response to the detection of current leakage. This may be useful in, for example, protecting users of the power connector 100 from electrocution or fire hazards.

Energy metering unit 508 may also provide an advantage in that the energy usage of individual devices can be monitored. Generally, energy metering devices are used to monitor the energy usage associated with an entire home or apartment unit. Since the energy monitoring unit is contained within power connector 100, the energy usage for individual devices can be monitored, which may allow a user to identify devices which are using a greater amount of power than expected. Such power consumption data may be particularly useful in industrial applications, where an abnormal power or energy consumption reading may be a useful indicator that maintenance may be required for a machine or appliance, and may allow for preventative maintenance to be carried out proactively, rather than being unaware of a problem until the machine or appliance reaches a point of failure. This may reduce the likelihood of costly repairs.

In some embodiments, active component 101 includes a transceiver 502. Transceiver 502 may be a wireless transceiver capable of transmitting and receiving data. In some embodiments, the transceiver 502 is integrated into logic unit 501 as, for example, an integrated processor or system on chip design. In some embodiments, the transceiver 502 is separate from and optically coupled to logic unit 501. The transceiver 502 provides the capability for the power connector 100 to communicate with a user. In some embodiments, the transceiver 502 is configured to communicate with a smart home protocol (e.g. Zigbee Alliance, Z-wave alliance, or the like).

Communication may be effected by, for example, establishing a network connection, such as to the internet or to a local area network. Once a communication connection is established, the transceiver may receive commands from a user via, for example, a computer or mobile computing device using an appropriate communication protocol. Such user commands may include commands from the user which cause the logic unit 501 to disable power flow (by opening the relays), or to enable power flow (by closing the relays).

As such, some embodiments of the present invention may allow a user to switch the power connector 100 on and off remotely, provided a communication link such as an Internet connection is available. This may be useful if a user forgets to turn off a device and has already left the house. For example, if the user leaves the oven turned on, the user could send a command from a remote network-connected device to power connector 100 and cause the power connector 100 to turn off, thus avoiding wasting energy, and reducing the risk of a fire.

Figure 12:
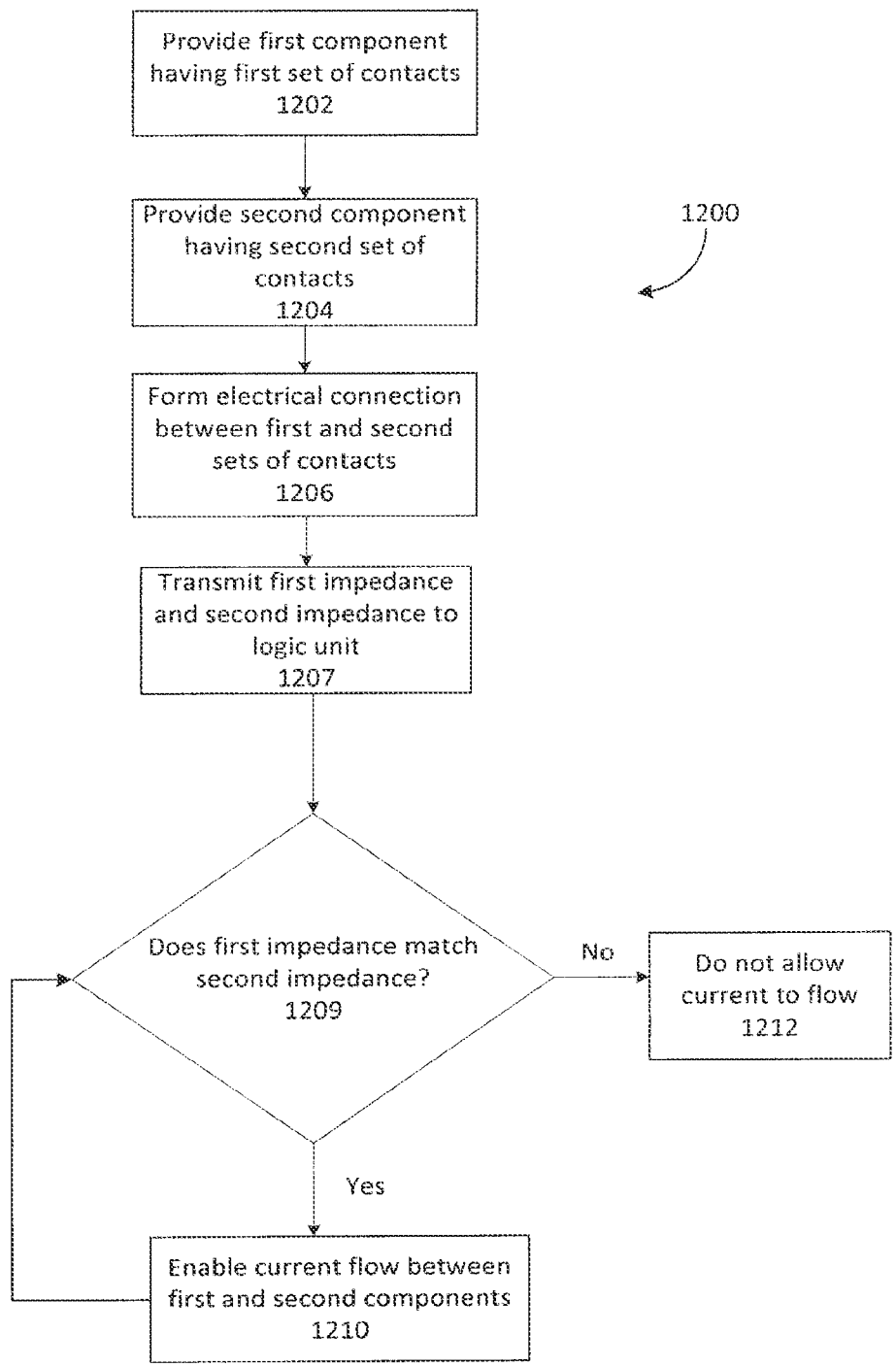
FIG. 12 is an example flowchart illustrating a method of enabling current flow between a power source and a device.

FIG. 12 is an example flowchart illustrating a method 1200 of enabling current flow between a power source and a device. At 1202, a first component is provided which has a first set of electrical contacts, including a first resistive contact having a first impedance. In some embodiments, the first component is active component 101. At 1204, a second component is provided which has a second set of electrical contacts, including a second resistive contact having a second impedance. In some embodiments, the second component is passive component 151.

At 1206, an electrical connection is formed between the first and second sets of contacts. An electrical connection may be formed, for example, by bringing active component 101 and passive component 151 into physical contact, such that the first set of electrical contacts 102, 104, 106, 108 makes physical contact with the second set of electrical contacts 152, 154, 156, 158.

Optionally, in some embodiments, a magnetic field may be detected while the active and passive components are in proximity. The magnetic field may be generated, for example, by a magnetic element on the second component. In some embodiments, the magnitude of the detected magnetic field is compared to a threshold. The threshold magnitude may be, for example, a required magnetic field strength to cause a Hall Effect sensor to output a particular voltage or other signal. In some embodiments, current flow might not be enabled if the detected magnetic field strength is insufficient. In some embodiments, the magnetic field strength is polled to ensure the continuing presence of a sufficiently strong magnetic field At 1207, the first impedance and the second impedance are transmitted to the logic unit 501. In some embodiments, the logic unit is integrated with the first component. In embodiments in which the logic unit 501 is integrated with the first component, the first and second impedances may be transmitted via a system bus. In some embodiments, the logic unit is external or separate from the first component. In embodiments in which the logic unit is separate from the first component, the first and second impedances may be transmitted by a data connection. The data connection may include a wireless network connection (e.g. an 802.11 wireless local area network, a wireless WAN, a cellular network (e.g. 4G LTE, EDGE, GPRS, and the like), or a wired data connection (e.g. wired Ethernet, power-line data connection, or the like). In some embodiments, the logic unit 501 may be part of a cloud-based or internet-based control system or smart home protocol (e.g. Zigbee, Z-wave Alliance, or the like).

At 1209, the first impedance and the second impedance are compared. If the first impedance matches the second impedance, then current flow between first component and second component is enabled at 1210. In some embodiments, the first and second impedances are periodically or continually monitored to verify that the first impedance still matches the second impedance. In some embodiments, the determination as to whether the first impedance matches the second impedance can be accomplished through the use of a logic unit 501, for example by polling the voltage at point A in FIG. 8. If the first impedance does not match the second impedance, then current flow is not enabled between the active and passive components at 1212.

It should be noted that the requirement in the example of FIG. 12 that the first impedance match the second impedance is merely an example of a condition related to the first impedance and the second impedance that must be satisfied. For example, other relationships between the first impedance and the second impedance may be used or configured in accordance various control systems or smart home protocols.

In some embodiments, the power source is an alternating current (AC) power source. A portion of the AC voltage from the power source may be converted to direct current (DC). The DC voltage may then be used for powering various logic elements in the active component 101, as well as for providing the reference DC voltage (e.g. 5 V) to the voltage divider created by the first and second resistive elements when the active and passive components are joined. In some embodiments, the active and passive components have one or more of hot, neutral and ground contacts, in addition to the resistive elements. The hot, neutral and ground contacts may pass the AC voltage from the active component to the passive component when current flow is enabled by logic unit 501 and, optionally, sensor 504.

In some embodiments, method 1200 further comprises providing a ferromagnetic element on the face of the active component 101 and providing a magnetic element on the face of the passive component 151. As noted above, the ferromagnetic element 110 need not generate a magnetic field, and can be any material which interacts with magnetic fields (e.g. any suitable materials containing nickel, cobalt, iron, or the like). In some embodiments, the magnetic element 160 is a magnetic field source (e.g. a bar magnet). An attractive force between the first and second faces may then be induced when they are brought into physical proximity (or within a predetermined distance), which may act to hold the first and second components together. The current flow may be enabled when the magnitude of a detected magnetic field exceeds a predetermined threshold. In some embodiments, the attractive force may be detected by a Hall effect sensor 504.

Moreover, in some embodiments, the presence of a sufficiently strong magnetic field can be a pre-condition for allowing current flow. For example, a Hall Effect sensor 504 may provide a secondary enabling signal which allows the current flow. Thus, in the absence of a second component which contains a magnetic element 160, the current flow may also be prevented from flowing from the first component to the second component.

In some embodiments, method 1200 further comprises receiving a command to enable or disable current flow between the first and second components, and enabling or disabling the current flow in response to receiving the command. In some embodiments, a transceiver 502 is used to send and receive commands. In some embodiments, the transceiver 502 is a wireless transceiver.

It should be noted that various inventive concepts may be embodied as one or more methods, of which multiple examples have been provided herein. The acts performed as part of a method may be ordered in any suitable way. Accordingly, embodiments may be constructed in which acts are performed in an order different than illustrated, which may include performing some acts simultaneously, even though shown as sequential acts in illustrative embodiments, or vice versa.

The above-described embodiments of the present invention can be implemented in any of numerous ways. For example, some features of some embodiments may be implemented using hardware, software, or a combination thereof. When implemented in software, the software code may be embodied as stored program instructions that may be executed on any suitable processor or collection of processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smartphone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touchpads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory tangible computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory tangible computer-readable storage media articles in any suitable form. For simplicity of illustration, data structures may be shown to have fields that are related through location in the data structure. Such relationships may likewise be achieved by assigning storage for the fields with locations in a non-transitory tangible computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to govern over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications, and improvements will readily occur to those skilled in the art. Such modifications and improvements are intended to be within the spirit and scope of the invention. Accordingly, the foregoing description is by way of example only, and is not intended as limiting.

What is claimed is:

1. A power connector system for electrically connecting a power source to a device, the power connector system comprising:
    a first component comprising:
        a first set of electrical contacts including a first electrically resistive element having a first impedance; and
        a first face having the first set of electrical contacts disposed thereon; and
    a second component comprising:
        a second set of electrical contacts including a second electrically resistive element having a second impedance; and
        a second face having the second set of electrical contacts disposed thereon; and
    wherein the first component further comprises a ferromagnetic element disposed on the first face, the second component comprises a magnetic element disposed on the second face, the magnetic element generating a magnetic field;
    wherein coupling the first component to the second component causes the first set of electrical contacts to form an electrical connection with the second set of electrical contacts, and wherein said coupling generates an attractive force between the ferromagnetic element and the magnetic element; and
    wherein a logic circuit is configured to enable current flow between the first component and the second component based at least in part on the first impedance and the second impedance.

2. The power connector system of claim 1, wherein the logic circuit is configured to enable current flow when the first impedance and the second impedance satisfy a predetermined condition.

3. The power connector system of claim 2, wherein the predetermined condition is the first impedance being equal to the second impedance.

4. The power connector system of claim 1, wherein the logic circuit is further configured to delay the enabling of the current flow for a predetermined time period.

5. The power connector system of claim 1, further comprising a processing device for monitoring energy consumption by the device.

6. The power connector system of claim 1, further comprising a transceiver configured to receive commands.

7. The power connector system of claim 6, wherein the transceiver is a wireless transceiver.

8. The power connector system of claim 1, wherein the first set of electrical contacts further comprises hot, neutral and ground contacts.

9. The power connector system of claim 1, further comprising a switching element for enabling a flow of current and a sensor, wherein the sensor is configured to:
   detect the magnetic field; and
   cause the switching element to enable the current flow when a magnitude of the magnetic field exceeds a threshold.

10. The power connector system of claim 1, wherein the second face comprises a first set of protruding portions and a second set of protruding portions, and wherein the first face comprises a first set of recessed portions for accepting the first set of protruding portions, and a second set of recessed portions for accepting the second set of protruding portions.

11. The power connector system of claim 10, wherein the first set of protruding portions have a convex shape and the first set of recessed portions have a concave shape.

12. The power connector system of claim 10, wherein the second set of protruding portions form a pyramidal shape and the second set of recessed portions form a shape complementary to the pyramidal shape.

13. The power connector system of claim 1, wherein the first set of electrical contacts are disposed on a plurality of substantially concentric contacts disposed on the first face.

14. The power connector system of claim 13, wherein the second set of electrical contacts are disposed on a plurality of protrusions extending from the second face.

15. The power connector system of claim 13, wherein the plurality of protrusions are spaced apart by a distance, wherein the distance is substantially equal to a distance separating the plurality of concentric contacts.

16. The power connector system of claim 1, wherein a ground contact and a resistive contact of the first set of electrical contacts are disposed on a plurality of substantially concentric circular contacts, and wherein the ground contact is biased outwardly by a resilient member.

17. The power connector system of claim 16, wherein a ground contact and a resistive contact of the second set of electrical contacts are disposed on a plurality of substantially concentric circular contacts, and wherein, when coupled, the ground contact of the second component compresses the resilient member.

18. The power connector system of claim 1, wherein the power source is an alternating current power source, and wherein the current flow is an alternating current flow.

19. The power connector system of claim 1, further comprising a gasket configured to seal an interface between the first face and the second face when the first component and the second component are coupled.

20. The power connector system of claim 1, wherein the logic circuit is separate from the first component.

21. A method of enabling a current flow between a power source and a device, the method comprising:
   providing a first component having a first set of contacts on a first face, wherein the first set of contacts includes a first electrically resistive element having a first impedance;
   providing a ferromagnetic element on the face of the first component;
   providing a second component having a second set of contacts on a second face, wherein the second set of contacts includes a second electrically resistive element having a second impedance;
   providing a magnetic element on the face of the second component, wherein the magnetic element produces a magnetic field;
   inducing an attractive force between the first face and the second face when the first face and the second face are separated by less than a predetermined distance;
   forming an electrical connection between the first set of contacts and the second set of contacts; and
   enabling current flow between the first component and the second component based at least in part on the first impedance and the second impedance.

22. The method of claim 21, wherein the first set of contacts comprise hot, neutral, ground, and resistive contacts, and wherein the second set of contacts comprise hot, neutral, ground and resistive contacts.

23. The method of claim 22, further comprising:
   connecting the first face to the power source, wherein the power source is an alternating current power source, and wherein the hot, neutral and ground contacts provide alternating current to the hot, neutral and ground contacts of the second component.

24. The method of claim 23, further comprising converting a portion of the alternating current power source to direct current, and wherein the resistive contact of the first component provides direct current to the resistive contact of the second component.

25. The method of claim 21, wherein enabling the current flow comprises enabling the current flow when the first impedance and the second impedance satisfy a condition.

26. The method of claim 25, wherein the condition is the first impedance matching the second impedance.

27. The method of claim 21, further comprising:
   enabling the current flow when a magnitude of the magnetic field exceeds a predetermined threshold.

28. The method of claim 21, further comprising:
   receiving a command to enable or disable the current flow between the first component and the second component; and
   responsive to receiving the command, enabling or disabling the current flow.

* * * * *